US005155503A

United States Patent [19]
Tasaki et al.

[11] Patent Number: 5,155,503
[45] Date of Patent: Oct. 13, 1992

[54] INK JET RECORDING APPARATUS WITH DETECTION OF ENVIRONMENTAL CONDITION USED TO CONTROL DOT THINNING RATE

[75] Inventors: Shigemitsu Tasaki, Kawasaki; Mikio Shiga, Yokohama, both of Japan

[73] Assignee: Canon Kabushiki Kaisha, Tokyo, Japan

[21] Appl. No.: 552,846

[22] Filed: Jul. 16, 1990

Related U.S. Application Data

[63] Continuation of Ser. No. 266,807, Nov. 3, 1988, abandoned.

[30] Foreign Application Priority Data

Nov. 5, 1987 [JP] Japan ............................... 62-279567

[51] Int. Cl.$^5$ .......................... G01D 15/16; B41J 2/05; B41J 2/195; B41J 2/205

[52] U.S. Cl. ............................................. 346/140 R

[58] Field of Search .............. 346/75, 140 R; 400/126

[56] References Cited

U.S. PATENT DOCUMENTS

| | | | |
|---|---|---|---|
| 4,050,077 | 9/1977 | Yamada | 346/75 |
| 4,065,775 | 12/1977 | Hou | 346/140 R |
| 4,087,825 | 5/1978 | Chen | 346/75 |
| 4,216,480 | 8/1980 | Buehner et al. | |
| 4,302,761 | 11/1981 | Yamamoto | 346/75 |
| 4,479,134 | 10/1984 | Kawanabe | |
| 4,630,076 | 12/1986 | Yoshimura | 346/140 R |
| 4,933,684 | 6/1990 | Tasaki | 346/140 R |

FOREIGN PATENT DOCUMENTS

| | | |
|---|---|---|
| 13296 | 7/1980 | European Pat. Off. |
| 144016 | 6/1985 | European Pat. Off. |
| 160318 | 11/1985 | European Pat. Off. |
| 0008360 | 1/1986 | Japan |
| 61-104860 | 5/1986 | Japan |
| 61-110576 | 5/1986 | Japan |
| 61-222758 | 10/1986 | Japan |
| 0090248 | 4/1987 | Japan |
| 0116153 | 5/1987 | Japan |

OTHER PUBLICATIONS

IBM Technical Disclosure Bulletin, vol. 27, No. 4B, (Sep. 1984).

IBM Technical Disclosure Bulletin, vol. 24, No. 8, (Jan. 1982).

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

This specification discloses an ink jet recording method and apparatus for printing thinning print dots and based upon a printing mode or the printing dot density of the characters.

8 Claims, 9 Drawing Sheets

INK JET RECORDING APPARATUS WITH DETECTION OF ENVIRONMENTAL CONDITION USED TO CONTROL DOT THINNING RATE

This application is a continuation of application Ser. No. 07/266,807 filed Nov. 3, 1988, now abandoned.

BACKGROUND OF THE INVENTION

1. Field of the Invention

This invention relates to an ink jet recording method, and in particular to an ink jet recording method in which the fixativeness after printing is effected on a recording sheet such as a sheet material is improved.

2. Related Background Art

An apparatus for printing characters (including ordinary images such as figures) by the use of an ink jet head, such as an ink jet printer or an ink jet recorder, is designed such that ink droplet discharge means provided in the ink jet head is driven on the basis of character information and character patterns are recorded by print dots formed by ink droplets adhering to a recording sheet.

In such an ink jet recording method, character dots are formed by liquid ink droplets and therefore, the fixativeness after printing poses a problem.

That is, if the fixativeness is poor, there occur various inconveniences such that, for example, undried characters are absorbed onto a second sheet material, printed characters are smeared when a second sheet material is fed after printing, and a printed sheet material becomes smeared when being handled by fingers.

So, as a method of improving the fixativeness of printed characters, use has heretofore been made of a method of heating a recording sheet after printing and expediting the desiccation thereof, or increasing the amount of sheet feed until the sheet is discharged after printing, or decreasing the pulse width of an ink discharge driving voltage.

Incidentally, recently the number of dots per character is increasing to improve the quality of print or improve the resolution of image, and for example, there is seen the tendency toward an increase from a head of 9 vertical dots to 24 dots, and further to 32 dots or 48 dots.

Such an increased number of character dots makes it difficult to improve the fixativeness only by the conventional method of expediting desiccation as described above. And particularly in the case of solid color image printing, block character printing, hollow character printing or printing of a pattern having many prints of high dot density such as a bit image, there has been the problem that the fixativeness is poor and the quality of print cannot be maintained.

Also, the fixativeness of printed characters is governed by environmental conditions such as temperature and humidity, but the prior art has encountered difficulties in coping with these environmental conditions

SUMMARY OF THE INVENTION

The present invention has been made in view of the above-noted problems peculiar to the prior art, and an object thereof is to provide an ink jet recording method which can secure the quality of print and yet can cope with the dot density and the environmental conditions such as humidity, etc. and improve the fixativeness.

Another object of the present invention is to provide an ink jet recording method characterized by thinning print dots and printing them when recording a printing mode or a character having many print dots.

In this case, if thinning information corresponding to each printing font data is pre-stored in a memory with the font data and setting is effected so that thinning is effected on the basis of said information during recording, the quality of print can be secured and yet the fixativeness can be effectively improved.

Also, if design is made such that humidity is detected and the thinning rate is changed in confirmity with the humidity, stable fixativeness can be secured even when the environment changes.

DESCRIPTION OF THE PREFERRED EMBODIMENTS

The present invention will hereinafter be described specifically with reference to the drawings.

Figure 1:
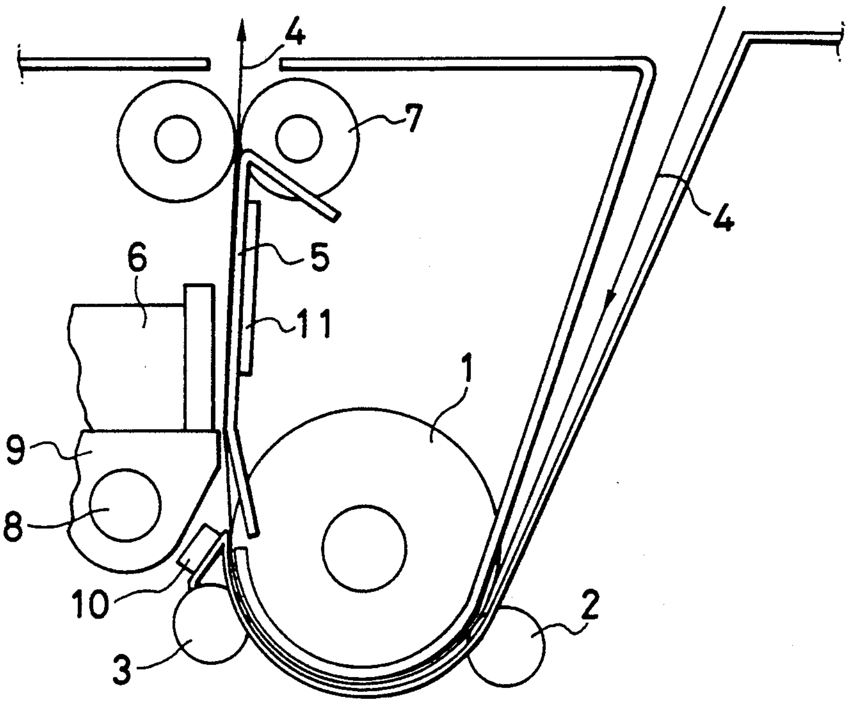
FIG. 1 is a longitudinal cross-sectional view of an ink jet recording apparatus suitable for carrying out the present invention.

FIG. 1 is a longitudinal cross-sectional view of an ink jet recording apparatus suitable for carrying out an ink jet recording method according to the present invention.

In FIG. 1, a sheet material (a sheet-like recording medium including a plastic sheet or the like) 4 is supplied in the direction of an arrow to a sheet feeding mechanism comprising a feed roller 1 and pinch rollers 2 and 3 separably urged against the lower peripheral surface thereof, and printing (formation of characters, figures and other images) is effected on the sheet material 4 while the sheet material 4 is pitch-fed through a recording station between a platen and an ink jet head 6.

As the ink jet head, use is made of a head which utilizes heat energy to discharge ink as droplets and form images, as shown, for example, in U.S. Pat. No. 4,723,129.

After printing, the sheet material 4 is discharged upward through discharge rollers 7.

The shown recording apparatus (printer) is a serial type one, and the ink jet head 6 having ink discharge ports is carried on a carriage 9 reciprocally movable to the left and right along the front face of the platen 5 (the sheet material 4) along a guide shaft 8.

Thus, an ink jet recording apparatus is constructed which prints characters comprising dot patterns of ink droplets on the sheet material 4 on the basis of character data supplied from a computer or the like.

In the ink jet recording apparatus of FIG. 1, a humidity sensor 10 is mounted at a location near the path of the sheet material 4 between the pinch roller 3 and the printing head 6, and a fixing heater 11 for heating the sheet material 4 to expedite the desiccation of print is disposed within the range through which the portion of the sheet material 4 passes immediately after printing.

Thus, in the recording apparatus of FIG. 1, an ink jet recording method is carried out which can improve the fixativeness after printing by thinning printing dots and effecting printing during a printing mode having many printing dots or recording characters.

Here, characters include ordinary characters and all kinds of images including figures and picture elements.

In the above-described ink jet recording method, there is adopted a control method whereby printing dot thinning information corresponding to each printing font data is stored in a memory with font data and dot thinning is effected on the basis of said thinning information during recording, and a method is carried out in which preset proper thinning is effected for each printed character, whereby the quality of printing is secured and yet the fixativeness after printing is improved.

Also, there is adopted the technique of providing the humidity sensor 10 in the recording apparatus, and effecting the control for changing the thinning rate in conformity with humidity, thereby maintaining stable fixativeness for any variation in environmental conditions.

Further, there is also carried out a recording method in which the dot thinning rate is varied by a manual operation such as closing and opening of a dip switch and the print density is varied as desired.

Figure 2:
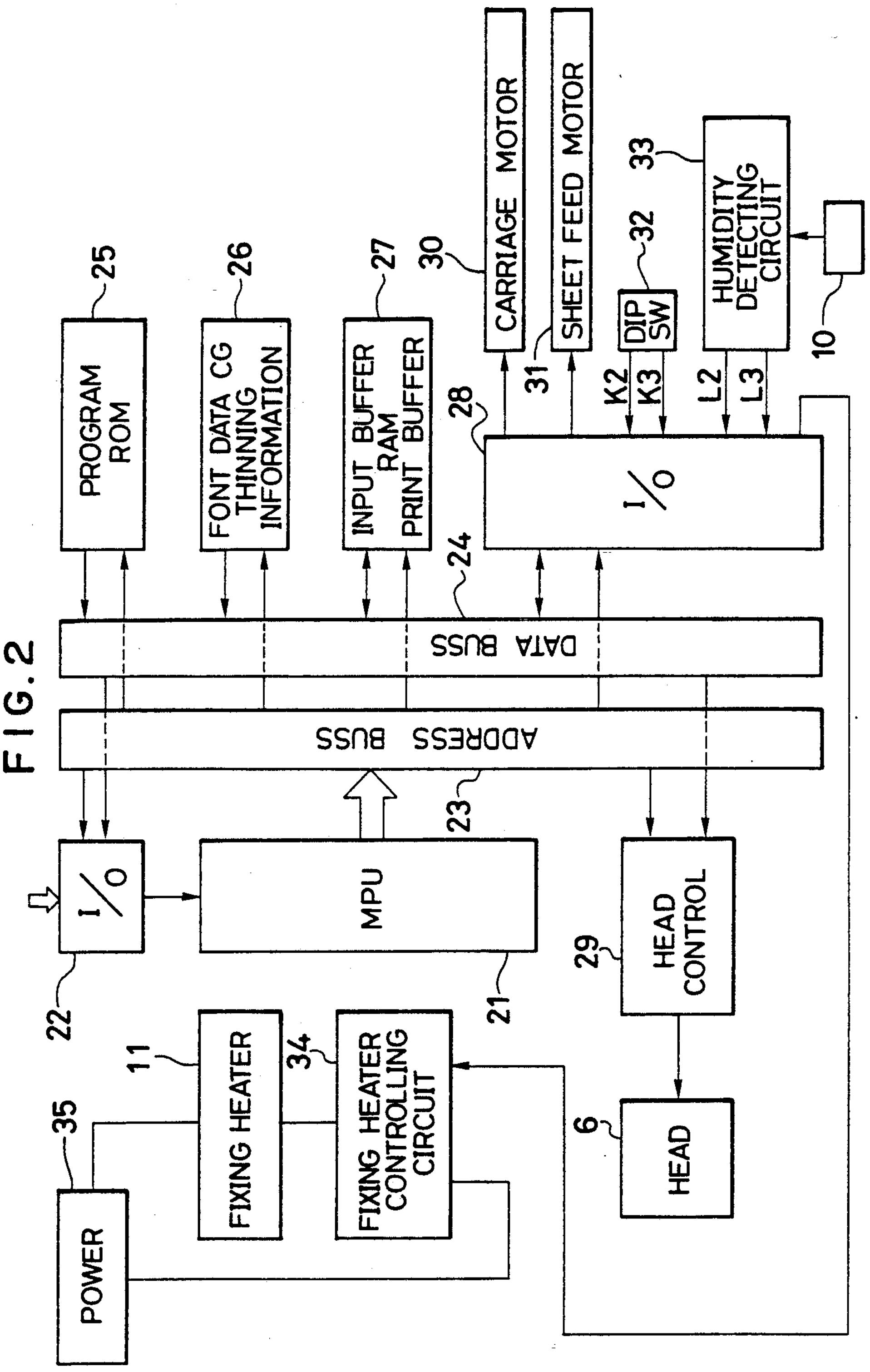
FIG. 2 is a block diagram of a control system suitable for carrying out the present invention.

FIG. 2 is a block diagram of a control system suitable for carrying out the ink jet recording method according to the present invention.

In FIG. 2, the control unit 21 of the recording apparatus is connected to a host computer or the like through an I/O port 22 and receives a printing command and printing data.

Connected to the control unit 21 through an address bus 23 and a data bus 24 are an ROM 25 storing a control program, etc. therein, a character generator 26 storing font data of various characters, etc. therein, an RAM 27 having a print buffer or the like, an I/O port 28 for transmitting a control signal to various operating portions and receiving detection signals from various sensors, and a head control 29 for controlling the ink jet head 6.

In the example shown, a motor 30 for driving the carriage 9, a sheet feed motor 31 for driving the feed roller 1, a dip switch 32 for setting thinned prints and the kinds thereof, a circuit 33 generating a humidity detection signal on the basis of the detected humidity, and a fixing heater controlling circuit 34 for switching on and off the fixing heater in conformity with set conditions are connected through the I/O port 28.

A level signal from the humidity sensor 10 is supplied into the humidity detecting circuit 33.

Also, the fixing heater controlling circuit 34 controls the driving current from a power source 35 to the fixing heater 11 on the basis of the heater temperature, etc.

Figure 3:
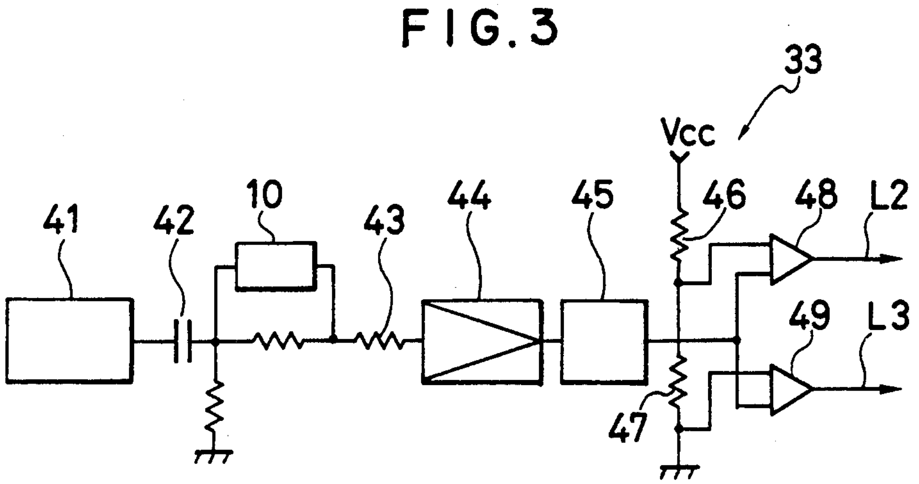
FIG. 3 diagrammatically shows the humidity detecting circuit in FIG. 2.

FIG. 3 shows the construction of the humidity detecting circuit 33 in FIG. 2.

The detecting circuit 33 of FIG. 3 is designed to apply an AC voltage to the sensor unit 10 and detect the humidity of two points (comparators 1 and 2).

That is, the output signal from an oscillator 41 has its DC component removed through a capacitor 42, and a voltage divided by a serial circuit comprising the sensor unit 10 and a reference resistor 43 is rectified by a rectifying circuit comprising an OP amplifier 44 and a diode 45, and has its DC voltage exchanged.

This DC voltage is compared with a reference voltage produced by resistors 46 and 47, by comparators 48 and 49, and detection of the humidity of two points (L2 and L3) is effected.

Thus, whether with the rise of the humidity, the humidity has reached a set value or more by the two points (L2 and L3) at which the humidity changes from "0" to "1" is detected.

Figure 4:
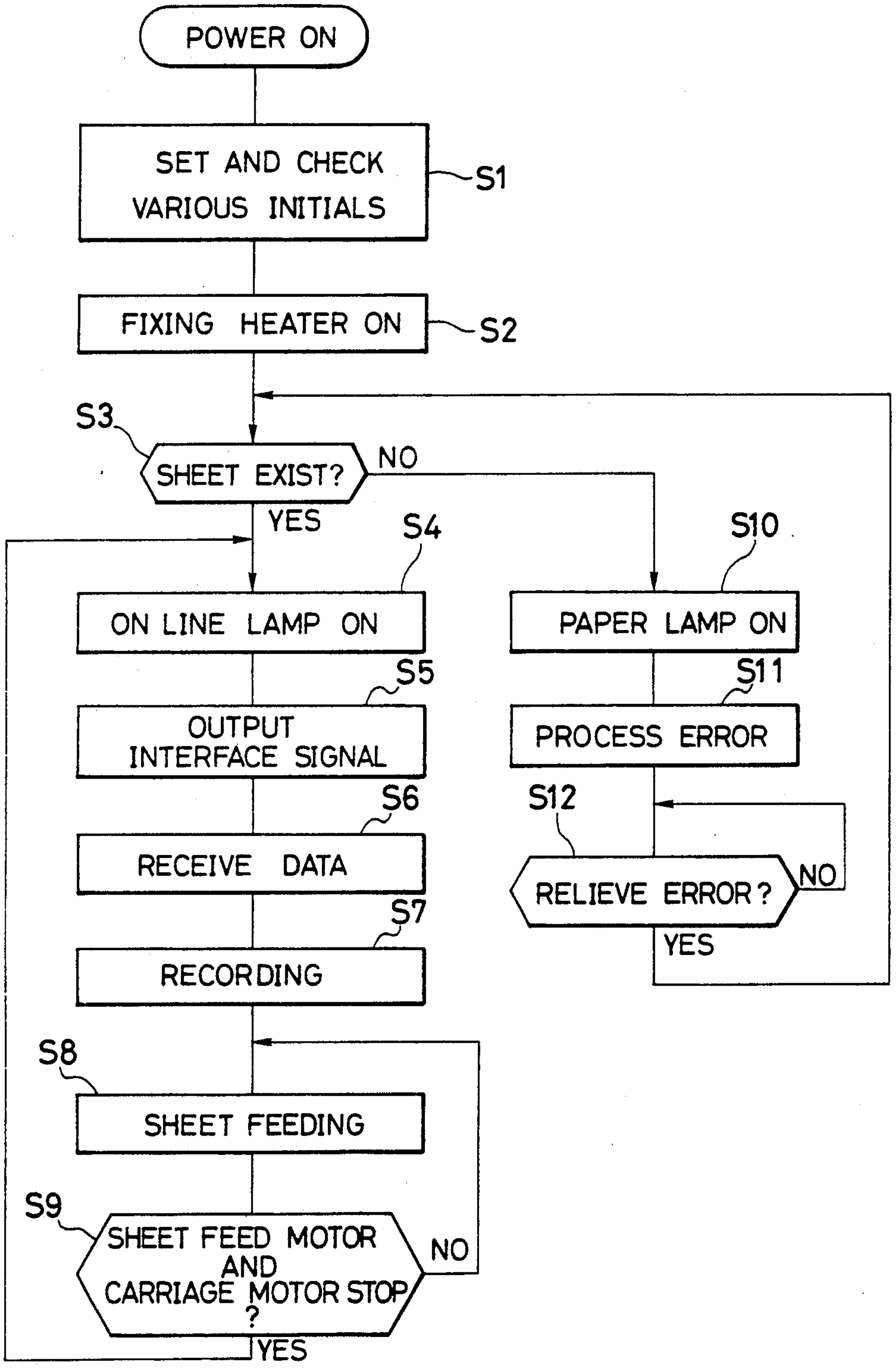
FIG. 4 is a flow chart showing the operation procedure of an ink jet recording method according to an embodiment of the present invention.

FIG. 4 is a flow chart showing the operation procedure when the method of the present invention is carried out in the above-described ink jet recording apparatus.

In FIG. 4, when the power switch is closed, at step S1, the control circuit 21, the interior of the RAM 27 and various operating portions are initial-set and the ROM, the RAM and the movement of the carriage are checked, and advance is made to the next step S2, where the fixing heater 11 is actuated.

Thereafter, advance is made to step S3, where whether the sheet material 4 has been supplied is discriminated by a sheet absence sensor.

If the sheet material 4 has been supplied, advance is made to step S4, where an on-line lamp representing the completion of the connection to a host machine such as a computer is turned on, and at step S5, an interface signal representative of the completion of the preparation for receiving data is output, and then advance is made to the next step S6, where data is received.

When data is received, advance is made to step S7, where recording of one line is effected on the sheet material 4, and when the recording of one line is completed, sheet feeding is effected at step S8, whereafter advance is made to step S9, where whether the sheet feed motor and the carriage motor have been stopped is discriminated.

If the motors are not stopped at step S9, return is made to step S8, where the sheet feeding operation is continued.

If the stoppage of the motors is confirmed at step S9, return is made to step S4, where the above-described operation is repeated to effect recording of the next line.

Further, recording is effected while the above-described operation is repeated for the entire sheet material.

If the absence of the sheet material is judged at the step S3, a paper lamp is turned on at step S10, and error processing is effected at step S11. Subsequently, advance is made to step S12, where whether the error has been released is discriminated, and if the error has not been released, the discrimination of step S12 is effected at each predetermined interval.

When the error is released, return is made to step S3, where the presence or absence of the sheet material 4 is discriminated and error processing is repeated until the sheet material 4 is supplied.

Figure 5:
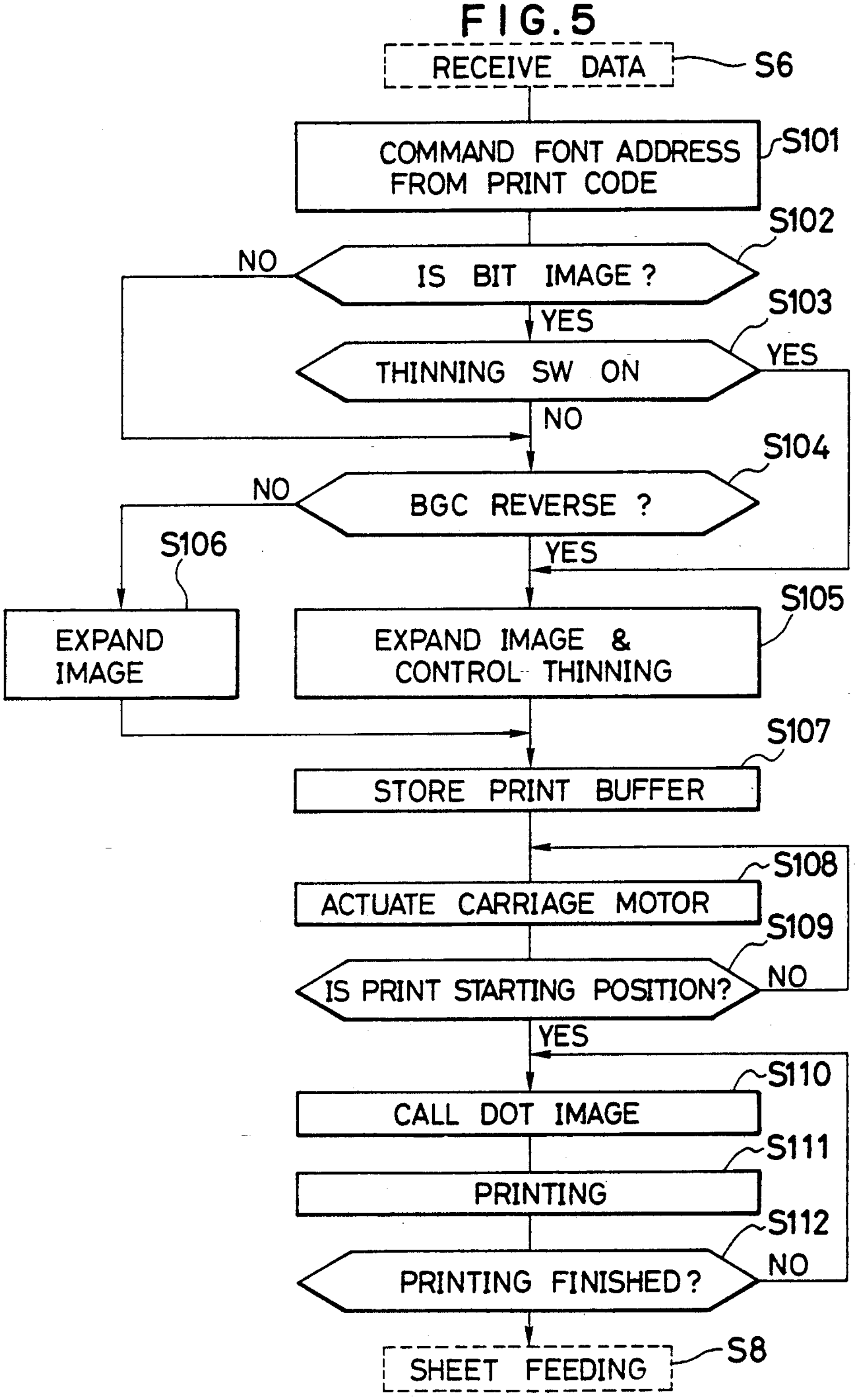
FIG. 5 is a flow chart of a first embodiment of the printing operation in FIG. 4.

FIG. 5 is a flow chart showing the detailed procedure of the recording operation at the step S7 in FIG. 4.

In FIG. 5, when at step S6, data is received and the recording operation is entered, at step S101, a font address is designated from a printing data code stored in the input buffer area of the RAM 27 transferred from the host, and advance is made to the next step S102, where whether printing of an ordinary character or printing of a bit image is to be effected is discriminated.

If a bit image is to be printed, whether thinning should be effected during the printing of the bit image, that is, whether the mode is set to thinned print in the state of the dip switch, is discriminated at step S103, and if the thinning switch is not ON, whether the character to be printed is BGC (block graphic character) printing or reverse printing (hollow character printing) or not is discriminated at the next step S104.

If the character to be printed is BGC print or reverse print, advance is made to step S105, where the image is expanded and predetermined thinning control is effected.

In the recording control of FIG. 5, the case where during the printing of ordinary characters, thinned print is not effected with importance attached to the quality of print as regards the printing of bit images, whether thinning should be effected can be selected by the dip switch and during BGC printing (including solid printing) and reverse printing, thinned print is always effected an example.

At step S105, BGC and reverse printing data are image-expanded and predetermined thinning control is effected, whereafter at step S107, they are stored into a print buffer in the RAM 27.

If at the step S102, a bit image is not to be printed, advance is immediately made to step S104, where whether BGC printing or reverse printing should be effected is discriminated.

Also, if at the step S103, the state is a state in which thinning is effected during bit image printing (the ON state of the dip switch), advance is directly made to step S105, where the data of bit image printing is image-expanded and predetermined thinning control is effected, whereafter at step S107, it is stored into the print buffer in the RAM 27.

If at the step S104, the printing data is neither BGC printing nor reverse printing (in the present embodiment, the case of an ordinary character), the image is expanded at step S106, whereafter advance is made to step S107, where the image-expanded data is stored into the print buffer in the RAM 27.

After step S107, the image data of the character is stored into the print buffer, the carriage motor is driven at step S108, and whether the carriage 9 (or the ink jet head 6) is in the print starting position is discriminated at step S109.

When the arrival of the carriage 9 at the print starting position is detected, a dot image is called at step S110, and printing is effected at step S111.

At step S112, whether the carriage 9 has arrived at one-line print finishing position is detected, and printing is executed until the carriage arrives at said print finishing position, and when the carriage arrives at said print finishing position, advance is made to the step S8 of FIG. 4, where sheet feeding is effected.

Figure 6:
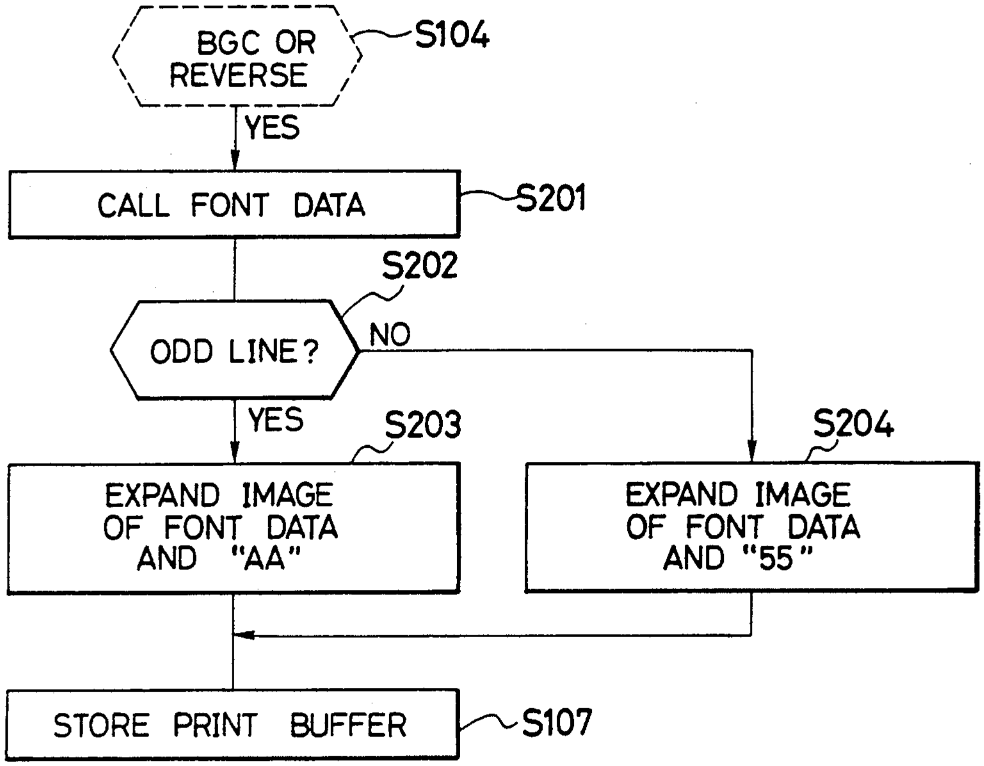
FIG. 6 is a flow chart showing the specific procedure of the thinning control in FIG. 5.
Figure 7:
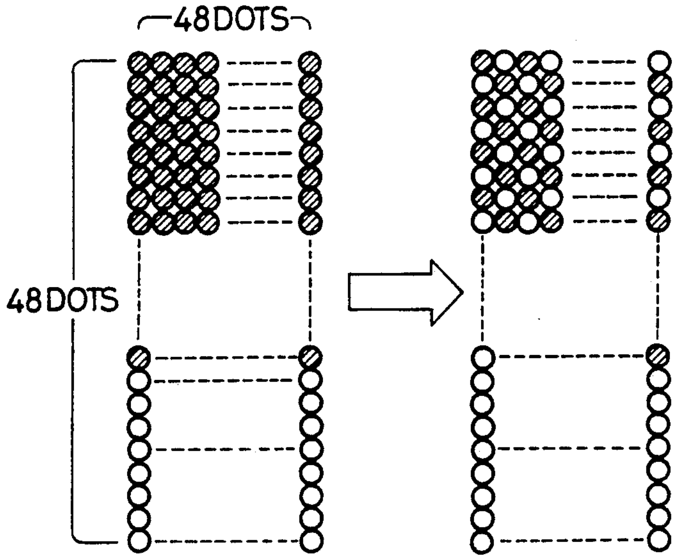
FIG. 7 is a schematic illustration of a dot image in which ½ thinning has been effected.

FIG. 6 is a flow chart illustrating the specific operations of image expansion and thinning control of BGC or reverse printing data at step S105 during the recording operation of FIG. 5, and FIG. 7 is a developed view showing the thinning control of FIG. 6 in the form of dot images.

In FIG. 6, if the printing data is BGC (block graphic character) printing or reverse printing (blank hollow character printing), advance is made to step S201, where the font data in the CG 26 is called, and at step S202, whether the font data is of an odd line or of an even line is discriminated.

If the font data is the data of an odd line, advance is made to step S203, where AND of the font data and "AA" is taken and the image is expanded, and at the step S107 of FIG. 5, that dot image is stored into the print buffer.

On the other hand, if the font data is the data of an even line, advance is made to step S204, where AND of the font data and "55" is taken and the image is expanded, and at the step S107 of FIG. 5, that dot image is stored into the print buffer.

According to the above-described thinning control, as shown in FIG. 7, dot thinning is effected in a staggered fashion for each line from a dot matrix, and thinned print in which the dot density is ½, that is, the thinning rate is 50%, can be accomplished.

Figure 8:
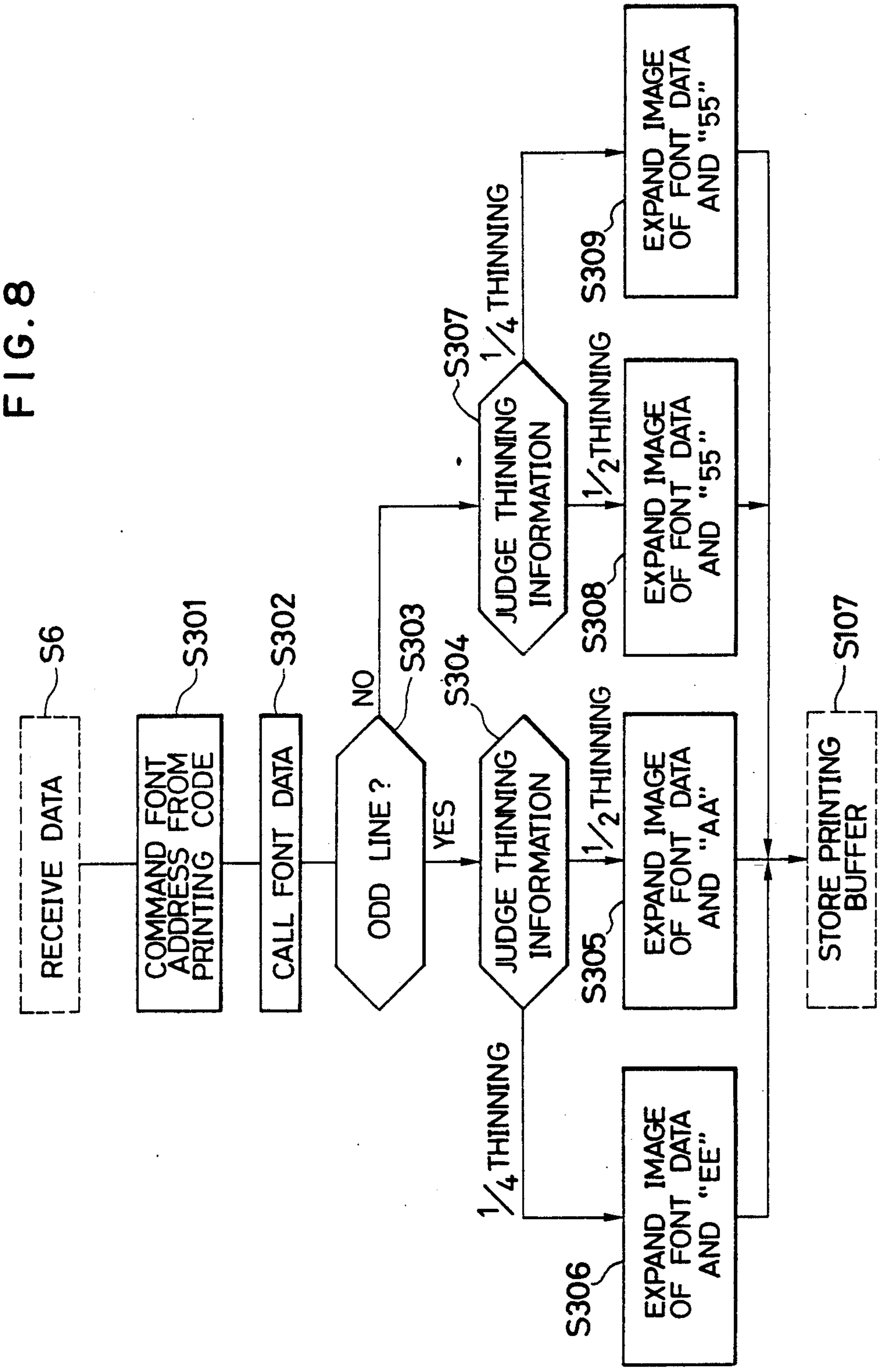
FIG. 8 is a flow chart of a second embodiment of the printing operation in FIG. 4.

FIG. 8 is a flow chart showing another operation procedure (embodiment) of the recording operation at the step S7 in FIG. 4, and shows the portions of the operation which differ from those of FIG. 5.

According to the ink jet recording method of the present invention, the thinning rate is varied in conformity with respective characters instead of the thinning information discriminating routine, whereby it can be utilized to improve the fixativeness by thinning, as well as to suitably change the printing density.

The flow chart of FIG. 8 shows the procedure of the recording operation using such thinning control corresponding to each character which can be utilized for the changing of the density as well.

In FIG. 8, when the recording operation is entered at step S6, data is received, a font address is first commanded from the printing data code at step S301, and at the next step S302, the font data in the CG 26 (FIG. 2) is called, whereafter at step S303, whether said font data is of an odd line or of an even line is discriminated.

If said font data is of an odd line, advance is made to step S304, where the type of the thinning information, that is, in the shown embodiment, whether the thinning rate is 50% or 25%, is judged.

If at step S304, the thinning rate is 50%, advance is made to step S305, where AND of the font data and "AA" is taken and the image is expanded.

On the other hand, if at step S304, the thinning rate is 25%, advance is made to step S306, where AND of the font data and "EE" is taken and the image is expanded.

If at the step S303, the font data is not of an odd line but of an even line, advance is made to step S307, where the type of the thinning information, that is, in the shown embodiment, whether the thinning rate is 50% or 25%, is judged.

If the thinning rate is 50%, advance is made to step S308, where AND of the font data and "55" is taken and the image is expanded.

On the other hand, if the thinning rate is 25%, advance is made to step S309, where AND of the font data and "BB" is taken and the image is expanded.

After the image expansion of one of the steps S305, S306, S308 and S309 has been effected, advance is made to step S107 of FIG. 5, where the image of the expanded thinned dot is stored into the print buffer, whereafter the operations of the steps S108–S112 of FIG. 5 are performed to effect recording (printing).

When effecting the print dot thinning control of FIG. 8, it is preferable that the print dot thinning information corresponding to each print font data in the CG (character generator) 26 of FIG. 2 be pre-stored in the corresponding memory with the font data and dot thinning be effected on the basis of said thinning information during recording (printing).

Figure 9:
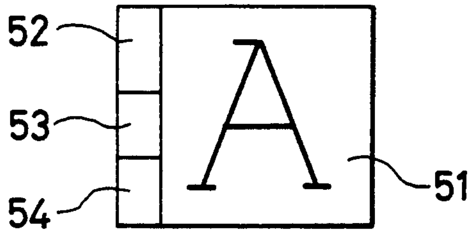
FIG. 9 is a schematic illustration showing a memory for character font data.

FIG. 9 illustrates the font data stored in the CG 26 (in the shown example, the font data of character "A").

Referring to FIG. 9, a thinning information area 52, a density information area 53 and other information area 54 are provided adjacent to the left of a font data area 51, for example, of 48×48 dots. That is, the information representative of the kind of the dot thinning (the thinning rate), with the font information, has an address allotted thereto.

Also, as a matter of course, the thinning information of each character may be collectively allotted to another address.

As regards the thinning information, for example, in terms of 4-bit code, 50% thinning can be represented by 0010, 25% thinning can be represented by 0100, and ⅓ thinning can be represented by 0011.

Figure 10:
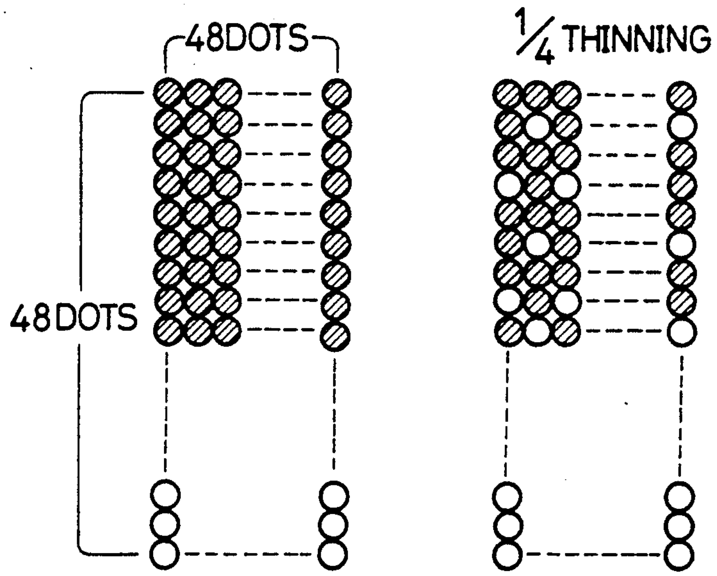
FIG. 10 is a schematic illustration showing the ¼-thinned state.

FIG. 10 is a developed view of the dot image when thinning control of ¼ thinning (the thinning rate of 25%) is effected.

This ¼ thinning illustratively shows the dot image obtained by the controlling operation at the steps S306 and S309 in FIG. 8, and control is effected so that from the dot matrix, every fourth dot beginning with the fourth dot in an odd line is thinned and every fourth dot beginning with the second dot in an even line is thinned.

Figure 11:
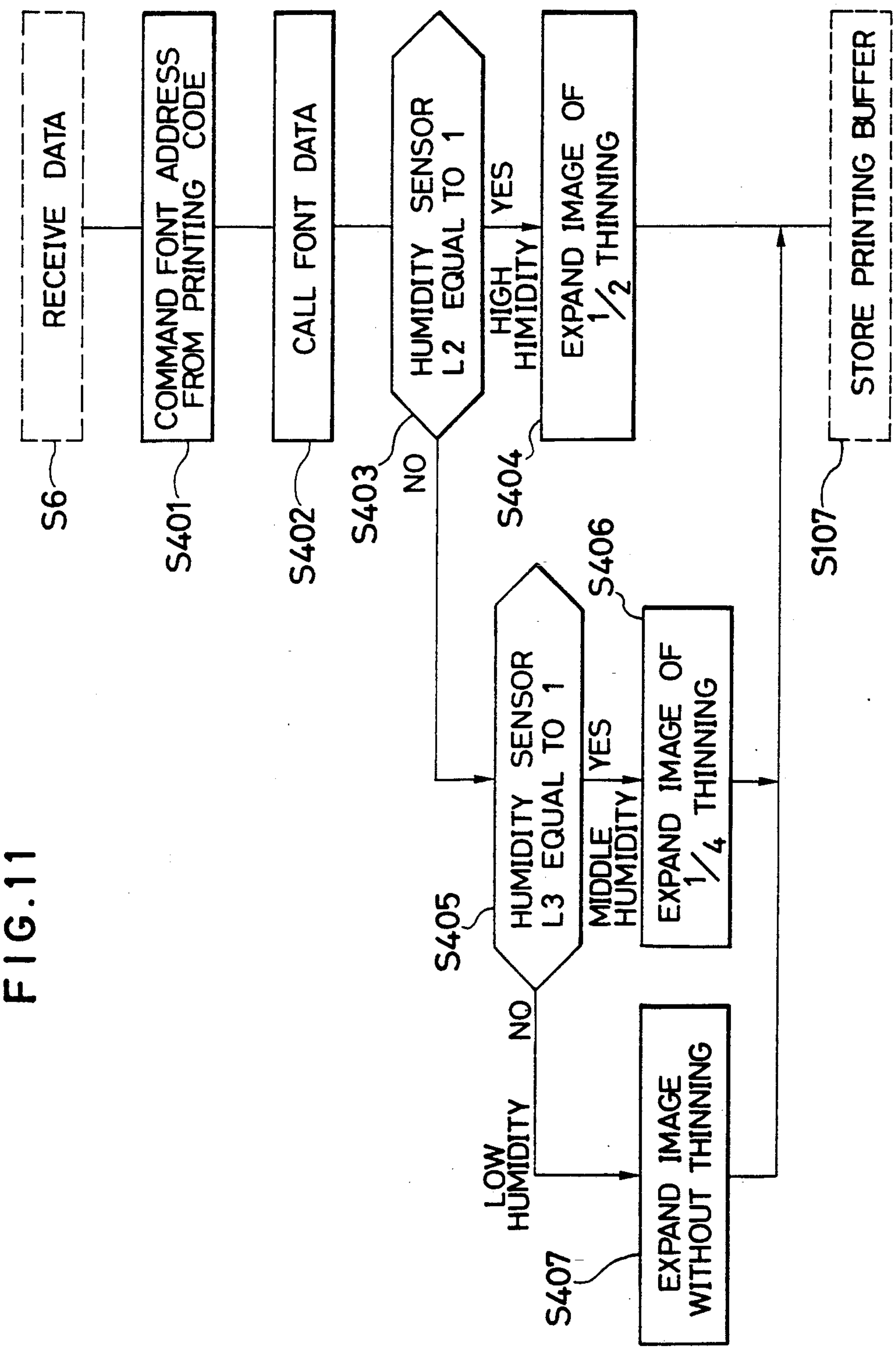
FIG. 11 is a flow chart of a third embodiment of the recording operation in FIG. 4.

FIG. 11 is a flow chart showing still another embodiment of the recording operation at step S7 in FIG. 4, and shows the portions of the operation which differ from those of FIG. 5.

In FIG. 11, when the recording operation is entered after the printing data is received at step S6, a font address is first commanded from the printing data code at step S401, and at the next step S402, the font data in the CG 26 (FIG. 2) is called, whereafter at step S403, the signal L2 from the humidity detecting circuit 33 (FIGS. 2 and 3) "1" (high humidity) is discriminated.

If the signal L2 is "1" (high humidity), advance is made to step S404, where thinning is effected at the thinning rate of 50% and the image is expanded.

If at step S403, the signal L2 is not "1" (high humidity), advance is made to step S405, where whether the signal L3 from the humidity detecting circuit 33 is "1" (medium humidity) or "0" (low humidity) is discriminated.

If the signal L3 is "1" (medium humidity), advance is made to step S406, where thinning is effected at the thinning rate of 25% (¼) and the image is expanded.

On the other hand, if the signal L3 is "0" (low humidity), advance is made to step S407, where the image is expanded without thinning.

After the image is expanded into a dot image, advance is made to step S107 in FIG. 5, where the dot image is stored into the print buffer, whereafter printing is effected while the operations of the steps S108–S112 of FIG. 5 are performed.

Figure 12:
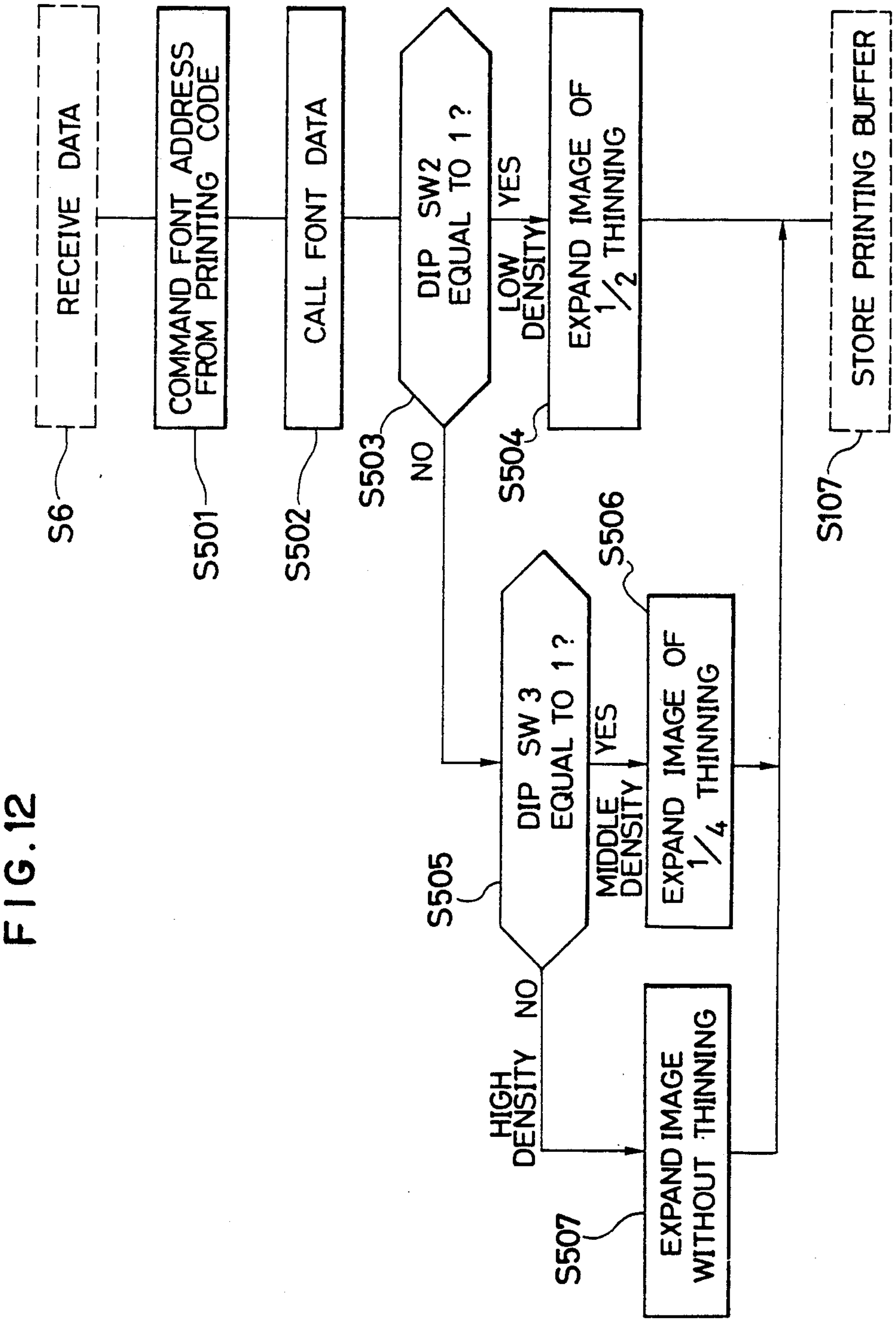
FIG. 12 is a flow chart of a fourth embodiment of the recording operation in FIG. 4.

FIG. 12 is a flow chart showing yet another embodiment of the recording operation at the step S7 in FIG. 4, and shows the portions of the operation procedure which differ from those of FIG. 5.

In FIG. 12, when the recording operation is entered after the printing data is received at step S6, a font address is first commanded from the printing data code at step S501, and at the next step S502, the font data in the CG 26 is called, whereafter at step S503, whether the signal K2 of the dip switch 32 (FIG. 2) is "1" (low density printing) or "0" (not low density printing) is discriminated.

If the dip switch is set to the low density printing, advance is made to step S504, where thinning is effected at the thinning rate of 50% (½ thinning) and the image is expanded.

If at step S504, the signal K2 is "0" (not low density), advance is made to step S505, where whether the signal K3 of the dip switch 32 (FIG. 2) is "1" (medium density printing) or "0" (high density printing) is discriminated.

In the case of the medium density printing, advance is made to step S506, where thinning is effected at the thinning rate of 25% (¼ thinning) and the image is expanded.

In the case of the high density printing, advance is made to step S507, where the image is expanded without thinning.

After the image is expanded into a dot image, advance is made to step S107 in FIG. 5, where the dot image is stored into the print buffer, whereafter printing is effected while the operations of the steps S108–S112 of FIG. 5 are performed.

Figure 13:
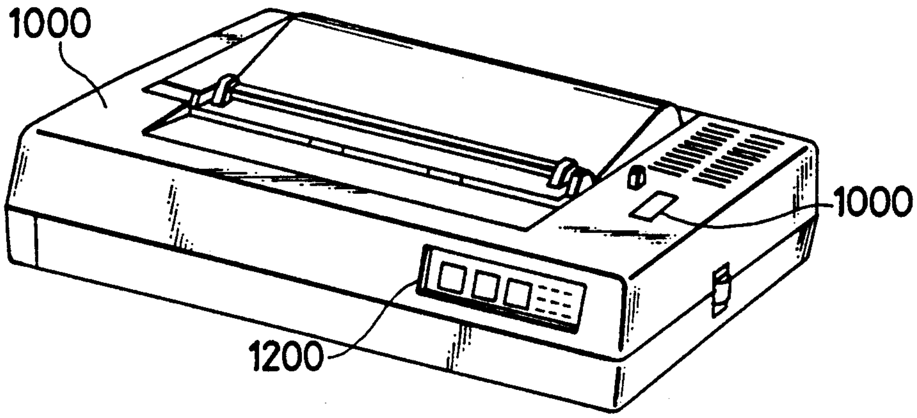
FIG. 13 is a schematic perspective view of an ink jet recording apparatus provided with the essential portions of the ink jet recording apparatus shown in FIG. 1.

FIG. 13 is a schematic perspective view of the ink jet recording apparatus provided with the essential portions of the ink jet recording apparatus shown in FIG. 1.

In FIG. 13, the reference numeral 1000 designates the apparatus body, the reference numeral 1100 denotes a power source switch, and the reference numeral 1200 designates an operating panel.

According to the above-described embodiment, the following effects can be achieved:

(i) The fixativeness after printing is improved by the print dot thinning control, and it becomes possible to prevent the inconveniences that, for example, the image is absorbed onto a second sheet material, that the printed characters are smeared by a second sheet material after printing and that the print is smeared by being touched by fingers.

(ii) For a pattern which is high in dot density and poor in fixativeness, such as solid printing, reverse (blank area) printing or block graphic character (BGC) printing, dot thinning is executed to improve the fixativeness, and for a pattern which is relatively low in dot density and has no problem in fixativeness, such as an ordinary character, printing is effected without dot thinning, whereby it becomes possible to realize both improvement in fixativeness and the maintenance of the quality of print.

In this case, for a print pattern having many prints of high dot density, such as a bit image, design is made such that whether thinning should be executed by the dip switch 32 can be manually manipulated by the user and therefore, it becomes possible to select whether importance should be attached to the fixation or the quality of print.

(iii) The thinning rate can be changed for various characters and therefore, fixativeness can be improved while the quality of print is secured.

Further, design can also be made such that dot thinning is positively utilized so as to enable the printing density to be changed stepwisely as desired by the user.

(iv) Humidity particularly humidity influences the fixativeness, but in the above-described embodiment, humidity is utilized to control the thinning rate and therefore, the fixativeness can be stably improved even if the environment changes from high humidity to low humidity.

As is apparent from the foregoing description, according to the present invention, when a printing mode or a character having many print dots is to be recorded, printing is effected with the print dots being thinned and therefore, there is provided an ink jet recording method which can improve the fixativeness after printing while securing the quality of print.

We claim:

1. A recording apparatus comprising:

feeding means for feeding a recording medium;

detecting means, disposed proximate to a feeding path of said feeding means, for detecting a surrounding environmental condition;

control means for changing a dot thinning rate based on the environmental condition detected by said detecting means; and recording means for recording on the recording medium in accordance with the dot thinning rate controlled by said control means.

2. A recording apparatus according to claim 1 wherein the dot thinning rate is changed to vary the printing density.

3. A recording apparatus according to claim 1, wherein said detecting means detects the humidity at said recording means.

4. A recording apparatus according to claim 1, wherein said detecting means detects the temperature at said recording means.

5. A recording apparatus according to claim 1, wherein said recording means includes thermal energy discharging means for discharging ink to effect recording.

6. A recording apparatus according to claim 1, wherein said recording means records characters including letters and graphic images.

7. A recording apparatus according to claim 1, further comprising a heater disposed proximate to the feeding path and at a position downstream of a position where recording by said recording means is effected, for heating the recording medium to promote fixing of the recording.

8. A recording apparatus according to claim 1, further comprising storing means for storing print dot thinning information corresponding to print font data in a memory that stores the print font data.

* * * * *

UNITED STATES PATENT AND TRADEMARK OFFICE

CERTIFICATE OF CORRECTION

PATENT NO. : 5,155,503
Page 1 of 2
DATED : October 13, 1992
INVENTOR(S) : SHIGEMITSU TASAKI ET AL.

It is certified that error appears in the above-identified patent and that said Letters Patent is hereby corrected as shown below:

Title page,

ABSTRACT [57]

Line 2, "and" (second occurrence) should be deleted.

COLUMN 5

Line 29, "print as" should read --print. As--.
Line 33, "an" should read --, for--.

COLUMN 7

Line 17, "other" should read --another--.
Line 20, "the" (second occurrence) should be deleted.

COLUMN 9

Line 3, "stepwisely" should read --stepwise--.
Line 5, "humidity" should be deleted.

UNITED STATES PATENT AND TRADEMARK OFFICE
CERTIFICATE OF CORRECTION

PATENT NO. : 5,155,503

DATED : October 13, 1992

INVENTOR(S) : SHIGEMITSU TASAKI ET AL.

It is certified that error appears in the above-identified patent and that said Letters Patent is hereby corrected as shown below:

COLUMN 10

Line 4, "claim 1" should read --claim 1,--.

Signed and Sealed this

Nineteenth Day of October, 1993

Attest:

Bruce Lehman

BRUCE LEHMAN

*Attesting Officer*

*Commissioner of Patents and Trademarks*